United States Patent [19]
Yokoyama et al.

[11] 4,095,244
[45] June 13, 1978

[54] HANDY CAMERA WITH A GRIP

[75] Inventors: Tsuneo Yokoyama; Toshiyuki Yajima; Kazumichi Tsuchiya; Hisao Takemae, all of Omiya, Japan

[73] Assignee: Fuji Photo Optical Co., Ltd., Omiya, Japan

[21] Appl. No.: 735,446

[22] Filed: Oct. 26, 1976

[30] Foreign Application Priority Data
Oct. 27, 1975 Japan ............................ 50-129123

[51] Int. Cl.² ............................................. G03B 29/00
[52] U.S. Cl. ...................................... 354/82; 354/195; 354/293; 352/243
[58] Field of Search ............... 354/293, 295, 288, 81, 354/82, 195, 197; 352/139, 178, 179, 243; 350/187, 255, 256

[56] References Cited
U.S. PATENT DOCUMENTS

| | | | |
|---|---|---|---|
| 3,668,989 | 6/1972 | Winkler et al. | 352/178 X |
| 3,877,048 | 4/1975 | Kellner | 354/82 X |

FOREIGN PATENT DOCUMENTS

391,460  9/1965  Switzerland .................... 354/293

*Primary Examiner*—L. T. Hix
*Assistant Examiner*—Alan Mathews

[57] ABSTRACT

A handy type TV camera or motion picture camera with a grip includes a focal length varying means, a diaphragm aperture varying means and a focus adjusting means. One of these means is electrically controlled by use of a servomotor controlled by a potentiometer. Another of these means is manually controlled by use of a manually operable ring mounted on the camera. The remaining of these means is either electrically or manually controlled. The potentiometer for controlling the servomotor is operated by use of a manually operable control member provided on the grip of the camera. The control member is located on the back of the grip at an upper portion so that it is easily operated with the thumb of the hand which is used to hold the grip. The control member is horizontally movable or rotatable and the grip is extended obliquely downward and forward to further facilitate the operation of the control member.

11 Claims, 5 Drawing Figures

HANDY CAMERA WITH A GRIP

BACKGROUND OF THE INVENTION

1. Field of the Invention

This invention relates to a handy type TV camera or motion picture camera with a grip, and more particularly to a handy camera with a grip including a focal length varying means, a diaphragm aperture varying means and a focus adjusting means wherein at least one of said means is electrically controlled by use of a servomotor.

2. Description of the Prior Art

The conventional handy type TV camera or motion picture camera is provided with a grip with which the camera body is supported by a hand. When the grip is held with the right hand, the left hand is used for operating various control means. The camera of this type is usually provided with a focal length varying means or zooming means, a diaphragm aperture varying means and a focus adjusting means. All of these means are controlled by use of the left hand when the grip is held with the right hand. Therefore, it is very difficult or almost impossible to simultaneously control two of these means.

On the other hand, it is sometimes desired that two of these means be controlled simultaneously. For instance, it may be desirable to adjust the focus while varying the focal length. Particularly when the focal length is varied from short to long, simultaneous adjustment of focus is often desired because the focal depth of the taking lens is decreased and a severe adjustment of focus is required as the focal length is varied from short (wide angle) to long (telescopic).

SUMMARY OF THE INVENTION

It is, therefore, the primary object of the present invention to provide a handy type camera with a grip in which it is possible to operate two control means such as a focal length varying means and a focus adjusting means simultaneously.

It is another object of the present invention to provide a handy type camera with a grip which is equipped with at least one control member that is easily operated with a finger or the thumb of the hand used for holding the grip so that one control means is operated with the hand used for holding the grip.

It is still another object of the present invention to provide a handy type camera with a grip which is provided with at least one servomotor for controlling one control means in the camera such as a focal length varying means, a diaphragm aperture varying means or a focus adjusting means, and with a control member for controlling the servomotor which is operated with a finger or the thumb of the hand used for holding the grip, whereby the control means controlled by the servomotor is easily operated by the finger or the thumb.

The above objects are accomplished by providing at least one control member which is operable with the thumb of the hand used for holding the grip on the back of the grip at an upper portion, and connecting the control member to a servomotor located within the camera for controlling one control means such as a focal length varying means, a diaphragm aperture varying means and a focus adjusting means. Further, one of the other control means is provided on the camera to be controlled with the hand not used for holding the grip.

The grip of the camera is extended obliquely downward and forward from the camera.

DESCRIPTION OF THE PREFERRED EMBODIMENT

Figure 1:
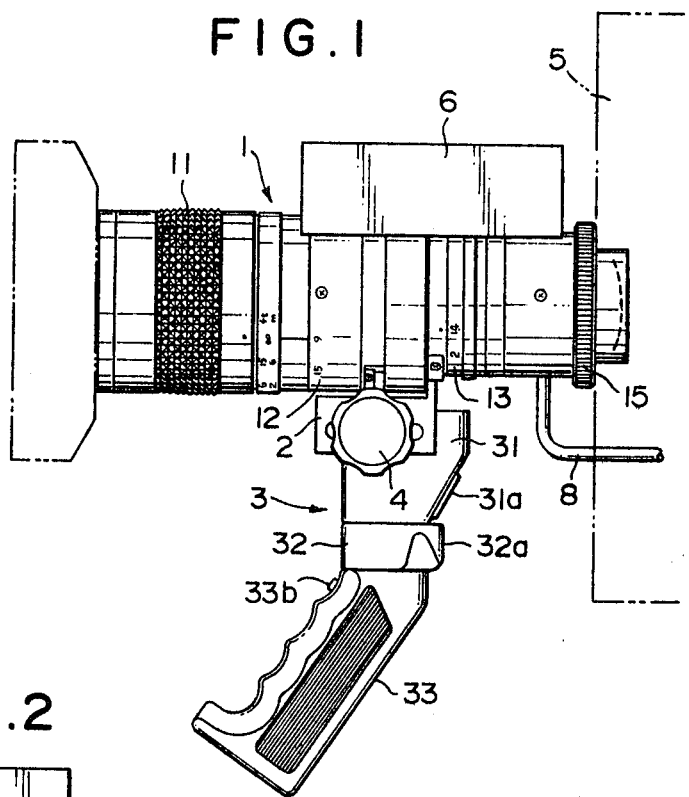
FIG. 1 is a side elevational view of an embodiment of the handy type TV camera with a grip in accordance with the present invention.
Figure 2:
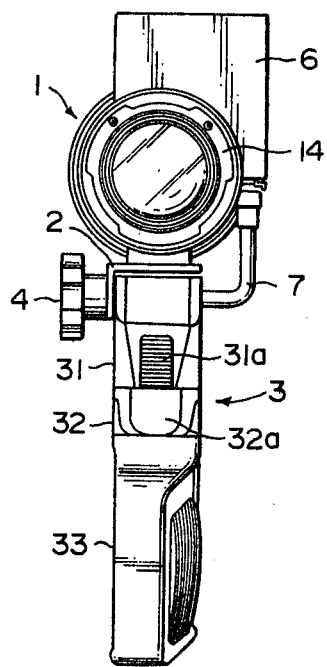
FIG. 2 is a rear elevational view of the TV camera as shown in FIG. 1.

A preferred embodiment of the present invention will hereinbelow be described in detail with reference to FIGS. 1 to 5. Referring to FIGS. 1 and 2, a lens barrel 1 including a focusing ring 11, a zooming ring 12 and a diaphragm ring 13 is mounted on a bracket 2 which is fixed to a grip 3 by means of a clamp knob 4. The rear end of the lens barrel 1 is connected to a camera body 5 by means of a bayonet mount 14 and a mount ring 15. The embodiment of the invention shown in FIGS. 1 to 5 is a TV camera and accordingly is connected to a camera body 5 of comparatively large size. When the invention is embodied in a motion picture camera, the size of the camera body is much smaller than that of the TV camera body 5.

The lens barrel 1 is further provided with a control box 6 mounted thereon including a servomechanism which controls the zooming ring 12 and the diaphragm ring 13 in accordance with electric signals given thereto from operating means which are mounted on the grip 3. For instance, the zooming ring 12 is operatively connected with a servomechanism provided in the control box 6 which controls the amount and speed of rotation of the zooming ring 12. The zooming ring 12 is, as well known in the art, rotated to vary the focal length of the taking lens of the camera in the lens barrel 1. The diaphragm ring 13 is also operatively connected with a servomechanism in the control box 6 which controls the amount of rotation of the diaphragm ring 13. The diaphragm ring 12 is, as well known in the art, rotated to vary the size of the diaphragm aperture of the taking lens in the lens barrel 1. The focusing ring 11 is manually operable to adjust the focus of an image formed on an image pick-up tube (not shown) in the camera body 5. The control box 6 is electrically connected with the grip 3 which contains manually operable operating or controlling means for electrically controlling the servomechanism by way of a cable 7 as shown in FIG. 2. The control box 6 is further electrically connected with the camera body 5 by way of a cable 8 as shown in FIG. 1.

The grip 3 is composed of a case portion 31 to which said bracket 2 is fixed with the clamp knob 4, a manually operable horizontally rotatable control member 32 for controlling the servomechanism to control the zooming ring 12, and a grip portion 33 extending obliquely downward and forward from the lens barrel 1, said manually operable control member 32 being located between the case portion 31 and the grip portion 33. The grip portion 33 is normally held with the right hand and the manually operable control member 32 for controlling the zooming ring 12 is, therefore, operated with the thumb of the right hand. Said focusing ring 11 on the lens barrel 1 is therefore manually operated with the left hand. The case portion 31 is provided with a manually operable diaphragm control means 31a on the back thereof. The diaphragm control means 31a is movable up and down to that it can be moved with the thumb of the right hand. Said manually operable member 32 for controlling the zooming ring 12 is rotatable in a horizontal plane and is provided with an operating portion 32a to be moved with the thumb on the back side thereof so that the control member 32 is easily rotated with the thumb.

Since the grip portion 33 extends obliquely downward and forward and the manually operable control member 32 has its operating portion 32a on the back thereof above the grip portion 33, the operation of the control member 32 is very easily conducted with the thumb of the hand used for holding the grip 3, i.e., the right hand. On the other hand, the focusing ring 11 is mounted on the lens barrel 1 so as to be operated with the left hand. Therefore, it is possible to control the focusing ring 11 at the same time the zooming ring 12 is controlled.

Figure 3:
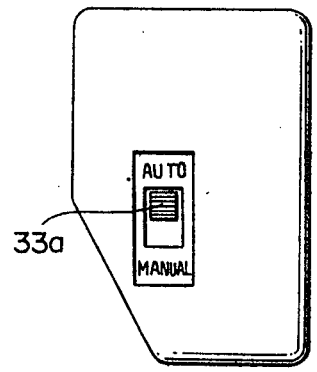
FIG. 3 is a bottom view of the grip of the TV camera as shown in FIGS. 1 and 2.

Said manually operable diaphragm control means 31a is used for manually operating the diaphragm ring 13 by way of an electrically operated servomechanism. However, the diaphragm ring 13 is normally controlled automatically in accordance with electric signals given by an automatic exposure control circuit (not shown) including a scene brightness measuring means as well known in the art. The camera of this embodiment is provided with an auto-manual change-over switch for making a change-over between the automatic control and the manual control of the diaphragm ring 13. FIG. 3 shows the change-over switch with the reference numeral 33a provided on the bottom of the grip portion 33.

The grip portion 33 is further provided with a video-monitor change-over switch 33b which is used for making a change-over between a monitor of the image taken by the camera and that of the image on broadcast. The video-monitor change-over switch 33b is located on the front face of the grip portion 33 at an upper portion thereof.

Figure 4:
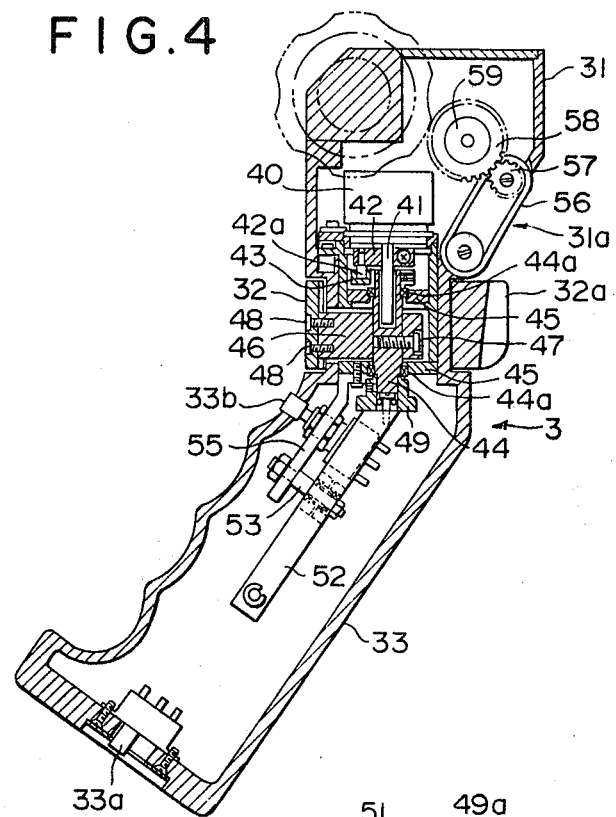
FIG. 4 is a vertical sectional side view of the grip of the camera as shown in FIGS. 1 to 3.
Figure 5:
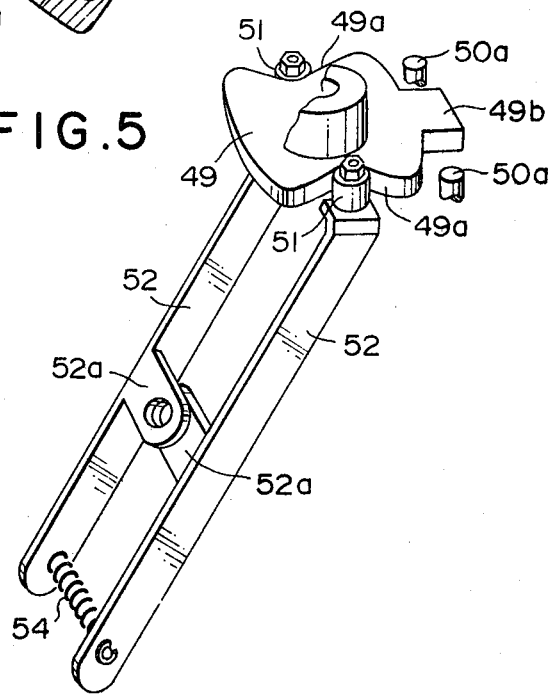
FIG. 5 is a perspective view of a mechanism employed in the grip of the camera for regulating the position of a control member provided in the camera.

The interior mechanism of the grip 3 is shown in FIGS. 4 and 5. As shown in FIG. 4, a potentiometer 40 is provided in the case portion 31 of the grip 3. The potentiometer 40 has a rotor shaft 41 rotated to control the potentiometer 40. A hub 42 is fixed to the rotor shaft 41 to be rotated therewith. The hub 42 has a pin 42a fixed thereto which is engaged with a flange 43 secured to a rotatable shaft 44. The rotatable shaft 44 is rotatably provided in the grip 3 coaxially with said rotor shaft 41 and vertically extends through said rotatable control member 32. The rotatable shaft 44 is rotatably supported with bearings 44a mounted on support flanges or walls 45 fixedly provided in the grip 3. An intermediate portion of the rotatable shaft 44 is provided with a block 46 secured thereto by means of a pin 47. The block 46 is secured to said rotatable control member 32 by means of pins 48. Thus, the rotatable control member 32 is fixed to the rotatable shaft 44 which in turn is connected to the rotor shaft 41 of the potentiometer 40. Therefore, the potentiometer 40 is controlled by rotating the control member 32. The potentiometer 40 is electrically connected with said servomechanism in the control box 6 for controlling the zooming ring 12. Thus, by rotating the control member 32 back and forth with the thumb of the right hand, the focal length of the taking lens of the camera is varied.

Referring to FIGS. 4 and 5, said rotatable shaft 44 is provided with a cam 49 fixed at the lower end thereof. The cam 49 has a pair of opposed curved recesses 49a on the opposite sides thereof and a projection 49b on another side. A pair of stopper pins 50a and 50b are provided to limit the rotation of the cam 49 by stopping the movement of the projection 49b. Said pair of curved recesses 49a of the cam 49 are engaged with a pair of rollers 51 rotatably mounted on an end of a pair of holding levers 52. The holding levers 52 are swingably mounted on a pivot shaft 53 at an intermediate portion thereof 52a. The other end or lower end of the pair of holding levers 52 is engaged with a compression spring 54 which acts to push the ends of the levers 52 outward to urge said rollers 51 in the direction to be pressed on said recesses 49a of the cam 49. In other words, the compression spring 54 is interposed between the lower ends of the pair of holding levers 52 to have the rollers 51 on the upper ends of the levers 52 pressed against the recesses 49a of the cam 49 to spring urge the cam 49 to be in its neutral position as shown in FIG. 5. Accordingly, when the cam 49 is rotated, the rollers 51 work to return the cam 49 to its original neutral position where the rollers 51 are engaged with the recesses 49a. Thus, the manually operable control member 32 is normally urged to be in its neutral position where the focal length of the taking lens is intermediate between the longest and shortest focal lengths. Said pivot shaft 53 for holding the pair of levers 52 is supported by a support arm 55 provided in the grip 33 so that the pair of levers 52 extend through the grip 33. Said video monitor switch 33b is also supported by the support arm 55 as shown in FIG. 4. The electric connection between the video monitor switch 33b and an electric circuit connected therewith is omitted from the drawing since the arrangement thereof is not related to the gist of the present invention. The electric connection between said auto-manual changeover switch 33a as shown in FIGS. 3 and 4 is also not shown in the drawing for the same reason.

Immediately above the manually operable control member 32 for controlling the zooming ring 12, a diaphragm control means 31a comprising an endless belt 56, a gear 57 fixed to a pulley of the belt 56, a second gear 58 meshed with the gear 57, a rotor 59 fixed to the second gear 58 and a potentiometer (not shown) connected with the rotor 59 for controlling a servomechanism (not shown) which controls said diaphragm ring 13 is provided. The endless belt 56 is partly exposed above the operating portion 32a of the control member 32 for controlling the zooming ring so that the exposed part of the endless belt 56 may easily moved with the thumb of the hand which holds the grip 33.

We claim:

1. A handy type camera with a grip including a focal length varying means, a diaphragm aperture varying means, and a focus adjusting means, wherein at least one of said means is electrically controlled by use of a servomotor which is controlled by a potentiometer and at least one of the other two means is manually controlled by means of a manual control member provided on the camera, wherein the improvement comprises a grip extending obliquely downward and forward from the camera, a manually operable horizontally movable control member provided immediately above the portion of the grip which is held by a hand so as to be operated by the thumb of the hand, a movable member provided within the grip and connected or secured to said control member for moving the potentiometer within the grip by movement thereof, whereby one of said means is controlled with the thumb of the hand which holds the grip and at least one of the other two means is controlled with the other hand.

2. A handy type camera with a grip as defined in claim 1 wherein said potentiometer moved by said movable member connected or secured to said control member is electrically connected with a servomotor which controls the focal length varying means.

3. A handy type camera with a grip as defined in claim 2 wherein said movable member is provided with a spring urged means which acts to hold said movable member at a neutral position.

4. A handy type camera with a grip as defined in claim 3 wherein said spring urged means comprises a cam having a neutral position and fixed to said movable member and a spring urged cam follower means engaged therewith for urging the cam to be in its neutral position.

5. A handy type camera with a grip as defined in claim 4 wherein said cam has a pair of opposed curved recesses and said cam follower means is a pair of rollers spring urged to be in pressure engagement with the curved recesses.

6. A handy type camera with a grip as defined in claim 5 wherein said pair of rollers are mounted on a pair of opposed levers an intermediate portion of which is pivotally mounted on a pivot shaft and a portion separated from said intermediate portion is engaged with a spring for urging said rollers into pressure engagement with said recesses of the cam.

7. A handy type camera with a grip as defined in claim 1 wherein said at least one of the other two means which is manually controlled by means of a manual control member provided on the camera is a focus adjusting means.

8. A handy type camera with a grip as defined in claim 7 wherein said manual control member is a manually operable focusing ring rotatably mounted on a lens barrel of the camera.

9. A handy type camera with a grip as defined in claim 1 wherein a manually operable control member for controlling said diaphragm aperture varying means is provided immediately above said manually operable horizontally movable control member.

10. A handy type camera with a grip as defined in claim 9 wherein said manually operable control member for controlling said diaphragm aperture varying means is an endless belt a part of which is exposed to be moved with the thumb of the hand which holds the grip.

11. A handy type camera with a grip as defined in claim 1 wherein said manually operable horizontally movable control member is horizontally rotatable, and said movable member connected with the control member is rotatable to rotate the potentiometer by rotation thereof.

* * * * *